United States Patent
Heerdink et al.

(10) Patent No.: US 9,014,616 B2
(45) Date of Patent: Apr. 21, 2015

(54) ALERT CONTENT RECEPTION APPARATUS, ALERT CONTENT COMMUNICATIONS SYSTEM AND METHOD OF ACQUIRING ALERT CONTENT

(75) Inventors: Berry Heerdink, Eindhoven (NL); Theo Kamalski, Weert (NL)

(73) Assignee: TomTom International B.V., Amsterdam (NL)

(*) Notice: Subject to any disclaimer, the term of this patent is extended or adjusted under 35 U.S.C. 154(b) by 397 days.

(21) Appl. No.: 13/383,253

(22) PCT Filed: Jul. 10, 2009

(86) PCT No.: PCT/EP2009/058835
§ 371 (c)(1),
(2), (4) Date: Jun. 12, 2012

(87) PCT Pub. No.: WO2011/003469
PCT Pub. Date: Jan. 13, 2011

(65) Prior Publication Data
US 2012/0244795 A1   Sep. 27, 2012

(51) Int. Cl.
| | |
|---|---|
| H04H 60/09 | (2008.01) |
| H04H 20/71 | (2008.01) |
| H04W 24/00 | (2009.01) |
| G01C 21/34 | (2006.01) |
| G08G 1/123 | (2006.01) |
| G08G 1/00 | (2006.01) |
| G06F 19/00 | (2011.01) |
| G06G 7/70 | (2006.01) |
| G06G 7/76 | (2006.01) |
| G01C 21/00 | (2006.01) |
| H04W 4/00 | (2009.01) |
| H04W 4/02 | (2009.01) |
| H04L 29/08 | (2006.01) |
| H04W 4/22 | (2009.01) |
| H04W 76/00 | (2009.01) |

(52) U.S. Cl.
CPC ............... *G01C 21/00* (2013.01); *H04W 4/001* (2013.01); *H04W 4/02* (2013.01); *H04W 4/021* (2013.01); *H04W 4/027* (2013.01); *H04W 4/22* (2013.01); *H04W 76/007* (2013.01); *H04L 67/18* (2013.01)

(58) Field of Classification Search
CPC .................. G08G 1/096844; G08G 1/096861; G08G 1/091; G01C 21/3415; H04L 67/18; H04W 4/22; H04W 76/007
USPC ............. 455/3.05, 3.04, 456.3; 701/117, 118, 701/410, 414, 417, 423, 431, 516, 533
See application file for complete search history.

(56) References Cited

U.S. PATENT DOCUMENTS

| | | | | |
|---|---|---|---|---|
| 6,101,443 | A  * | 8/2000 | Kato et al. ..................... | 701/414 |
| 6,314,368 | B1 * | 11/2001 | Gurmu et al. ................. | 701/414 |
| 2004/0073361 | A1 | 4/2004 | Tzamaloukas et al. | |
| 2007/0159966 | A1* | 7/2007 | Sumner et al. ................ | 370/229 |
| 2008/0102896 | A1* | 5/2008 | Wang et al. .................... | 455/560 |
| 2009/0176511 | A1 | 7/2009 | Morrison | |
| 2009/0248828 | A1 | 10/2009 | Gould et al. | |
| 2010/0069093 | A1* | 3/2010 | Morrison ................... | 455/456.3 |

FOREIGN PATENT DOCUMENTS

| | | |
|---|---|---|
| JP | 2007060489 A | 3/2007 |
| JP | 2009109465 A | 5/2009 |

OTHER PUBLICATIONS

International Search Report issued Apr. 8, 2010 for International Application No. PCT/EP2009/058835.

* cited by examiner

*Primary Examiner* — Wesley Kim
*Assistant Examiner* — Devan Sandiford

(57) ABSTRACT

An alert content reception apparatus comprises a communications interface (229) compatible with a data broadcast service and capable of receiving, when in use, a broadcast data message comprising reference data concerning alert content. The apparatus also comprises a processing resource (202) arranged to analyze, when in use, the broadcast data message and acquire the alert content associated with the reference data in response to determining that the alert content associated with the reference data has not previously been acquired. The communications interface (229) is compatible with a bidirectional data communications service, the processing resource (202) also being arranged to cooperate with the communications interface (229) in order to retrieve the alert content via the bidirectional data communications service.

9 Claims, 9 Drawing Sheets

ALERT CONTENT RECEPTION APPARATUS, ALERT CONTENT COMMUNICATIONS SYSTEM AND METHOD OF ACQUIRING ALERT CONTENT

This application is the National Stage of International Application No. PCT/EP2009/058835, filed date 10 Jul. 2009, and designating the United States. The entire contents of this application is incorporated herein by reference.

FIELD OF THE INVENTION

The present invention relates to an alert content reception apparatus of the type that, for example, is capable of receiving alert content from a remote source of alert content. The present invention also relates to an alert content communications system of the type that, for example, comprises an alert content reception apparatus capable of acquiring alert content from a server apparatus. The present invention further relates to a method of acquiring alert content, the method being of the type that, for example, acquires content relating to an alert from a remote source of alert content.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but can be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

As mentioned above, it is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 940 LIVE model manufactured and supplied by TomTom International B.V., provide a reliable means for enabling users to navigate from one position to another. Such devices are of great utility when the user is not familiar with the route to the destination to which they are navigating.

As an extension to a real time traffic monitoring system of the type mentioned above, it is desirable to support presentation of urgent messages to a user of the PND. Whilst PNDs and other client terminals remotely located from a service provider are able to receive traffic-related data, for example via a Radio Data System (RDS) Traffic Message Channel (TMC) or a so-called "High Definition (HD)" traffic system available from TomTom International BV, the service provider is currently unable to deliver reliably and in an automated manner, alert content, particularly of an urgent nature, for example an emergency message, to a group of terminals in a geographical area to which the alert content relates. One reason for this technical impediment is that a Global System for Mobile communication (GSM) communications network and a Universal Mobile Telecommunications System (UMTS) communications network have limited capability to "push" content in an efficient and a geographically targeted manner to one or more Mobile Subscriber (MS) or User Equipment (UE) respectively at a network level. Also, messaging technology of the respective networks, for example text messaging services, is limited in the volume of data that can be transmitted to a mobile device using a single message or "page". In this respect, where it is necessary to communicate an emergency warning message containing the volume of data constituting the message within a matter of seconds, the GSM and UMTS networks do not provide a service to facilitate this urgent requirement.

In the field of Digital Audio Broadcasting (DAB), automotive manufacturers, in conjunction with the Transport Protocol Expert Group (TPEG) of the Traveller Information Services Association (TISA), are developing a so-called "TPEG-Automotive" or TPEG-A service. Electronic devices in vehicles will become available that support the TPEG-A service, which is being designed to support instant communication of Emergency Warning (EW) messages from public authorities to suitably equipped in-vehicle devices. However, access to the TPEG-A service to communicate the EW messages is restricted and so impedes the provision of EW messages by a private service offering enhanced quality of service, including information quality.

SUMMARY OF THE INVENTION

According to a first aspect of the present invention, there is provided an alert content reception apparatus comprising: a communications interface compatible with a data broadcast service and capable of receiving, when in use, a broadcast data message comprising reference data concerning alert content; and a processing resource arranged to analyse, when in use, the broadcast data message and acquire the alert content associated with the reference data in response to determining that the alert content associated with the reference data has not previously been acquired; wherein the communications interface is compatible with a bidirectional data communications service, the processing resource also being arranged to cooperate with the communications interface in order to retrieve the alert content via the bidirectional data communications service.

A communications unit may be operably coupled to the communications interface for supporting the data broadcast service and/or the bidirectional data communications service.

The bidirectional data communications service may support an Internet Protocol.

The data broadcast service may be constrained by a network operator associated therewith so that a volume of data broadcast in respect of the broadcast data message is restricted.

The data broadcast service may implement a radio telematics broadcast channel. The radio telematics broadcast channel may be supported by a Radio Data System, for example but not exclusively, a Traffic Message Channel (RDS-TMC).

The data broadcast service may be an unconfirmed push service. The data broadcast service may be a one-to-many messaging service. The data broadcast service may be a cell broadcast service.

The data broadcast service may have a first Quality of Service associated therewith that is lower than a second Quality of Service associated with the bidirectional data communications service.

The bidirectional data communications service may be a packet switched data service. The data broadcast service may not be a packet switched data service.

The data broadcast service may be a text messaging service. The bidirectional data communications service may not be a text messaging service.

The reference data may identify the alert content. The reference data may comprise version data.

The processing resource may be arranged to generate a request message identifying the alert content sought; and the processing resource may also be arranged to cooperate with the communications interface in order to transmit the request message.

The broadcast data message may comprise geographical indication data associated with the alert content.

The processing resource may be arranged to determine a current location associated therewith and using the geographical indication data to determine whether the alert content relates to the current location of the processing resource.

The alert content may relate to the current location by virtue of the geographical indication data relating to a location within a predetermined distance from the current location.

The processing resource may be capable of supporting calculation of a route for a journey and to determine whether the alert content relates to the route calculated.

The alert content may relate to a location within a predetermined proximity of the route calculated.

The processing resource may be arranged to determine whether the alert content relates to a remaining portion of the route calculated.

The processing resource may be arranged to determine a level of priority associated with the alert content.

The broadcast data message may comprise detour-related data associated with the alert content. The alert content may comprise detour-related data.

According to a second aspect of the present invention, there is provided a navigation apparatus comprising: the alert content reception apparatus as set forth above in relation to the first aspect of the invention; and a receiver of location-related data, the processing resource being operably coupled to the receiver of location-related data and arranged to perform, when in use, location determination.

The navigation apparatus may be a portable navigation device.

According to a third aspect of the present invention, there is provided an alert content communication system comprising: the alert content reception apparatus as set forth above in relation to the first aspect of the invention; and a server apparatus remotely located with respect to the alert content reception apparatus and capable of communicating with the alert content reception apparatus via a wireless communications network.

The server apparatus may be arranged to generate the broadcast data message and to initiate broadcast of the broadcast data message via the communications network for receipt by the alert content reception apparatus.

The server apparatus may be arranged to receive the alert content via an alert content feed.

The server apparatus may be arranged to receive the request message and to generate a content delivery message comprising the alert content; the alert content may be identified in the request message.

The server apparatus may be arranged to communicate the content delivery message to the alert content reception apparatus.

According to a fourth aspect of the present invention, there is provided a method of acquiring alert content, the method comprising: receiving a broadcast data message comprising reference data concerning alert content; analysing the broadcast data message; and acquiring the alert content associated with the reference data in response to determining that the alert content associated with the reference data has not previously been acquired; wherein the alert content is retrieved via a bidirectional data communications service.

According to a fifth aspect of the present invention, there is provided a computer program element comprising computer program code means to make a computer execute the method as set forth above in relation to the fourth aspect of the invention.

The computer program element may be embodied on a computer readable medium.

It is thus possible to provide an alert content reception apparatus, an alert content communications system, and method of acquiring alert content that enable content, for example alert content, such as an emergency warning message, to be communicated to a number of electronic devices without the need of a communications network to provide a push service. Also, a greater message length capacity is possible than existing broadcast techniques. The apparatus, system and method provide accessibility to information generated by a public authority without the need to use more restrictive broadcast services to convey the information. Content can therefore be communicated to electronic apparatus with minimised delay. As the content can comprise detour-related data, prioritisation data and/or version data, user experience in relation to an electronic apparatus, for example a navigation apparatus, is therefore improved. Hence, the user is less likely to participate in traffic congestion and hence be delayed. Where delays are nevertheless encountered despite use of the detour-related information, the delay can be reduced. The ability to minimise delay reduces inconvenience to the user. By obviating the need for the user to trigger manually a route recalculation due to a need for a detour reduces driver workload and hence also improves safe use of the electronic apparatus. Additionally, the ability to provide content on an urgent basis to electronic apparatus improves safety support to the user.

Other advantages of these embodiments are set out hereafter, and further details and features of each of these embodiments are defined in the accompanying dependent claims and elsewhere in the following detailed description.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
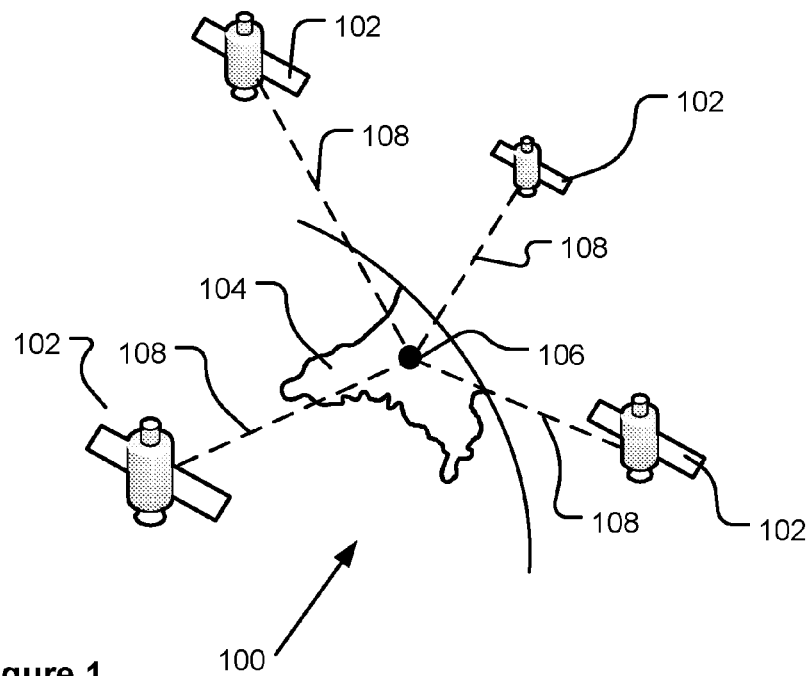
FIG. 1 is a schematic illustration of an exemplary part of a Global Positioning System (GPS) usable by a navigation apparatus.

Throughout the following description identical reference numerals will be used to identify like parts.

One or more embodiments of the present invention will now be described with particular reference to a PND. It should be remembered, however, that the teachings herein are not limited to PNDs but are instead universally applicable to any type of electronic processing device capable of determining a location thereof, for example but not essentially those configured to execute navigation software in a portable and/or mobile manner so as to provide route planning and navigation functionality. It follows therefore that in the context of the embodiments set forth herein, an electronic apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing, for example, route planning and navigation software. Indeed, a mobile telephone, smartphone, a music player, such as an MP3 player, or the like can simply be employed in respect of some embodiments without the benefit of route planning or navigation software.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be, determined with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. As mentioned above, the GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
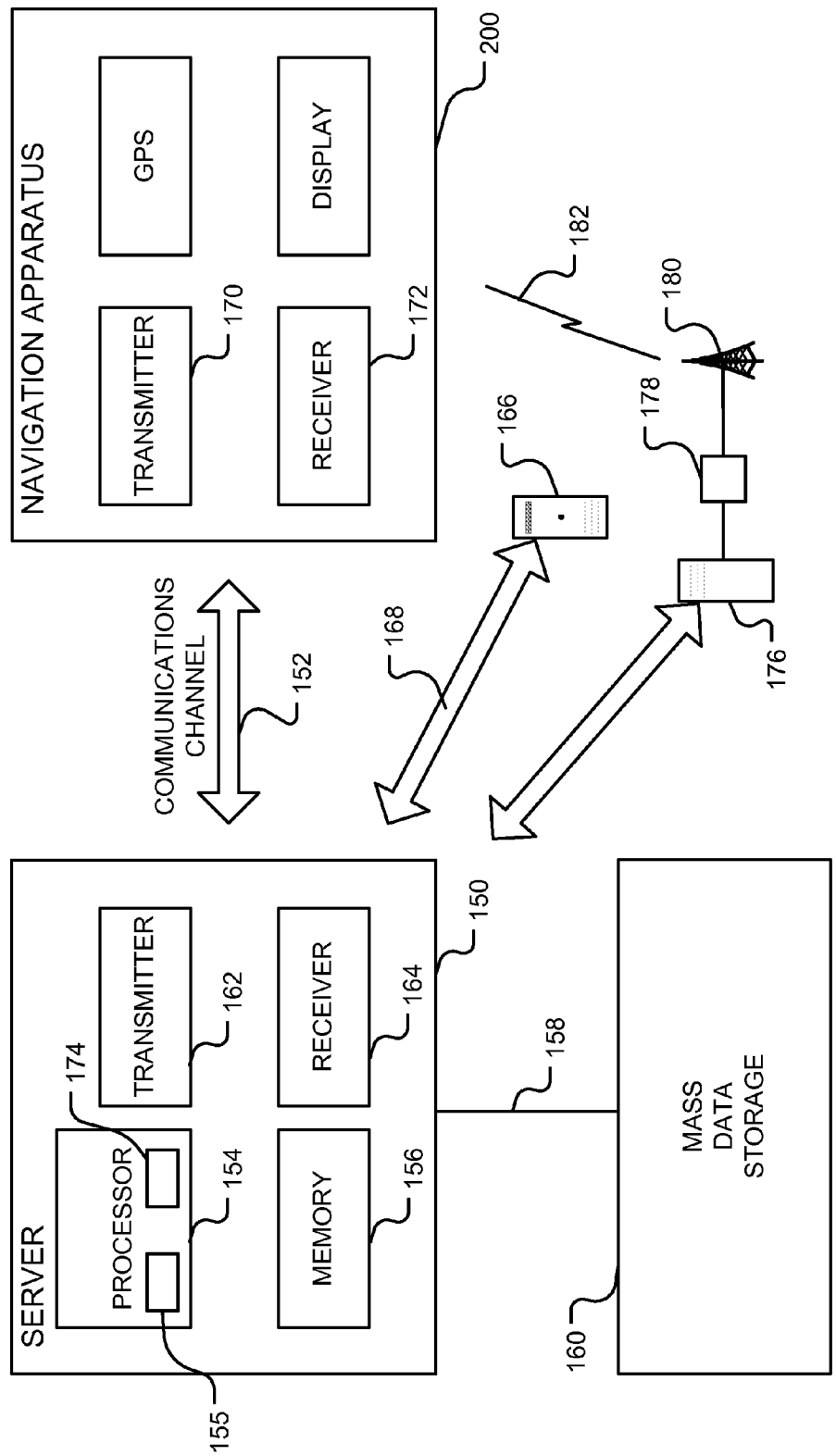
FIG. 2 is a schematic diagram of an alert content communications system and/or a data collection system.

In FIG. 2, an alert content communications system comprises a navigation apparatus 200 capable of communicating, if desired in an embodiment, with a server 150 via a communications channel 152 supported by a communications network that can be implemented by any of a number of different arrangements. The communication channel 152 generically represents the propagating medium or path that connects the navigation apparatus 200 and the server 150. The server 150 and the navigation apparatus 200 can communicate when a connection via the communications channel 152 is established between the server 150 and the navigation apparatus 200.

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications signals, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 is supported by telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication if required.

The communication signals transmitted through the communication channel 152 include, but are not limited to, signals as may be required or desired for given communication technology. For example, the signals may be adapted to be used in relation to cellular communication technology such as a Time Division Multiple Access (TDMA) access scheme, a Frequency Division Multiple Access (FDMA) access scheme, and/or a Code Division Multiple Access (CDMA) access scheme, etc. Both digital and analogue signals can be transmitted through the communication channel 152. These signals may be modulated, encrypted and/or compressed signals as may be desirable for the communication technology.

In this example, the navigation apparatus 200 comprising or coupled to the GPS receiver device 106, is capable of establishing a data session, if required, with network hardware of a communications network, for example a "mobile" communications network via a wireless communications terminal (not shown), such as a mobile telephone, PDA, and/or any device with mobile telephone technology, in order to establish a digital connection, for example a digital connection via known Bluetooth technology. Thereafter, through its network service provider, the mobile terminal or user equipment can establish a network connection (through the Internet for example) with the server 150. As such, a "mobile" network connection can be established between the navigation apparatus 200 (which can be, and often times is, mobile as it travels alone and/or in a vehicle) and the server 150 to provide a "real-time" or at least very "up to date" gateway for information.

The navigation apparatus 200 can be a Bluetooth enabled navigation apparatus in order that the navigation apparatus 200 can be agnostic to the settings of the wireless communications terminal, thereby enabling the navigation apparatus 200 to operate correctly with the ever changing spectrum of mobile telephone models, manufacturers, etc. Model/manufacturer specific settings can, for example, be stored on the navigation apparatus 200, if desired. The data stored for this information can be updated.

Instead of requiring the wireless communications terminal to provide access to the communications network, and in this example, the navigation apparatus 200 can, of course, comprise mobile telephone technology, including an antenna, for example, or optionally using an internal antenna of the navigation apparatus 200. The mobile telephone technology within the navigation apparatus 200 can also include an insertable card (e.g. Subscriber Identity Module (SIM) card). As such, mobile telephone technology within the navigation apparatus 200 can similarly establish a network connection between the navigation apparatus 200 and the server 150, via the Internet for example, in a manner similar to that of any wireless communications-enabled terminal. In this example, the mobile telephone technology is compatible with a GSM communications network and supports a communications interface (not shown) that is compatible with a data broadcast service, for example a cell broadcast service, and a bidirectional data communications service.

As explained above, the establishment of the network connection between the mobile device (via a service provider) and another device such as the server 150, using the Internet for example, can be done in any suitable known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection can be utilised, which can be achieved via a data connection using the mobile telephone or mobile telephone technology.

The server 150 includes, in addition to other components which may not be illustrated, a processor 154 constituting a processing resource and operatively connected to a memory 156 and further operatively connected, via a wired or wireless connection 158, to a mass data storage device 160. The processor 154 supports a content handler module 155, details of which will be described later herein. The mass storage device 160 is arranged to store alert content and associated data, for example narrative text, and associated reference and optional version data. Further details of such data are set out later below. The mass storage device 160 can be a separate device from the server 150 or can be incorporated into the server 150. The processor 154 is further operatively connected to transmitter 162 and receiver 164, to transmit and receive information to and from the navigation apparatus 200 via the communications channel 152. The signals sent and received may include data, communication, and/or other propagated signals. The transmitter 162 and receiver 164 may be selected or designed according to the communications requirement and communication technology used in the communication design for the channel usage data communications system. Further, it should be noted that the functions of transmitter 162 and receiver 164 may be combined into a single transceiver. In addition to communication with the navigation apparatus 200, the server 150 is also capable of communicating with a message source data server 166 located remotely from the server 150, for example at a remote data centre. In this respect, the message source data server 166 communicates with the server 150 via another communications channel 168. In another embodiment, the functionality of the message source data server 166 can be combined with the functionality of the server 150.

The processor 154 also supports a Cell Broadcast Entity (CBE) 174 that is capable of communicating with a Cell Broadcast Centre (CBC) 176 of, in this example, a GSM communications network. The CBC 176 is operably coupled to a Base Station Controller (BSC) 178 of the GSM communications network, the BSC 178 being operably coupled to a Base Transceiver Station (BTS) 180. The BTS 180 is capable of communicating with the navigation apparatus 200 in accordance with the GSM standard via a Radio Frequency (RF) interface 182. Although not shown in FIG. 2, the skilled person will, of course, appreciate that the GSM communications network includes more that one BSC and BTS.

As mentioned above, the navigation apparatus 200 can be arranged to communicate with the server 150 through the communications channel 152. In one embodiment, the navigation apparatus 200 employs transmitter 170 and receiver 172, for example as part of the internal mobile telephone technology mentioned above, to send and receive data through the communications channel 152. Further, the transmitter 170 and receiver 172 are selected or designed according to communication requirements and communication technology used in the communication design for the navigation system and the functions of the transmitter 170 and receiver 172 may be combined into a single transceiver in a like manner to that described above in relation to the server apparatus 150. Of course, the navigation apparatus 200 comprises other hardware and/or functional parts, which will be described later herein in further detail.

Software stored in server memory 156 provides instructions for the processor 154 and allows the server 150 to provide services to the navigation apparatus 200 and/or perform other data processing tasks. For example, the server apparatus 150 can provide a content alert service involving sending messages identifying available alert content and processing requests for alert content from the navigation apparatus 200 and transmitting the alert content from the mass data storage 160 to the navigation apparatus 200. Of course, the server apparatus 150 can, optionally, support other functionality as will be described in further detail later below.

The server 150 can be used as a remote source of data accessible by the navigation apparatus 200 via, for example, a wireless channel. The server 150 may include a network server located on a local area network (LAN), wide area network (WAN), virtual private network (VPN), etc. Indeed, as mentioned above, a Personal Computer (PC) can be connected between the navigation apparatus 200 and the server 150 to establish an Internet connection between the server 150 and the navigation apparatus 200.

Figure 3:
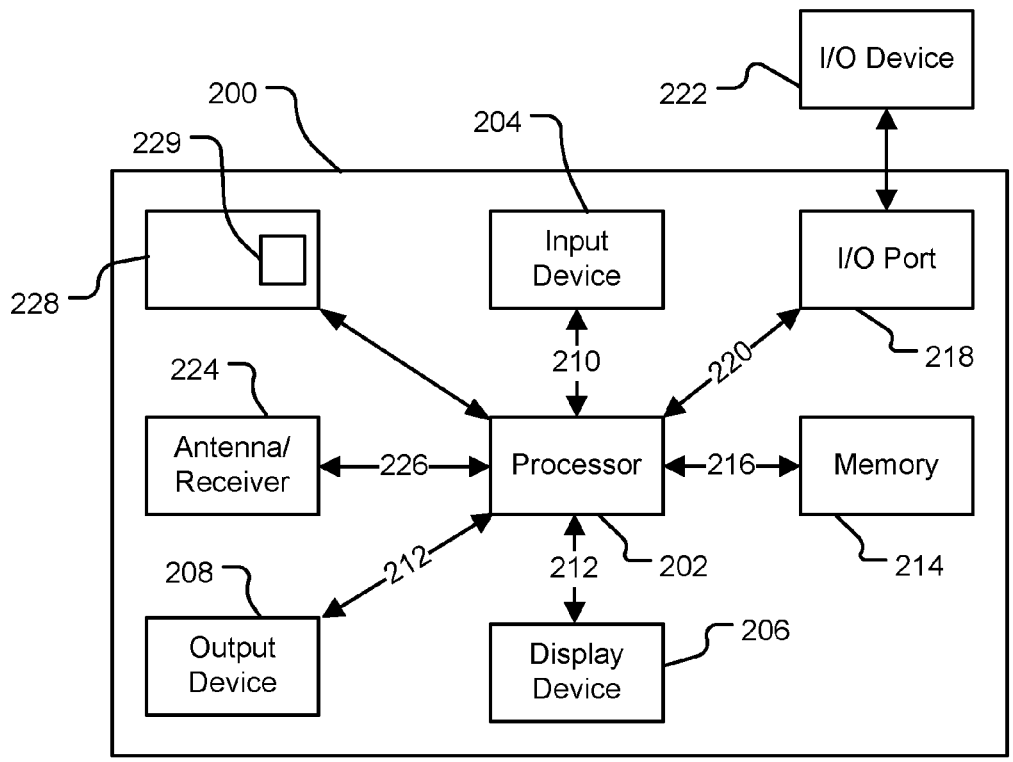
FIG. 3 is a schematic diagram of electronic components of a navigation apparatus constituting an embodiment of the invention.

Referring to FIG. 3, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource, for example a processor 202, the processor 202 being coupled to an input device 204 and a display device, for example a display screen 206. The processing resource and the communications interface (mentioned above) constitute parts of an alert content reception apparatus. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

Figure 5:
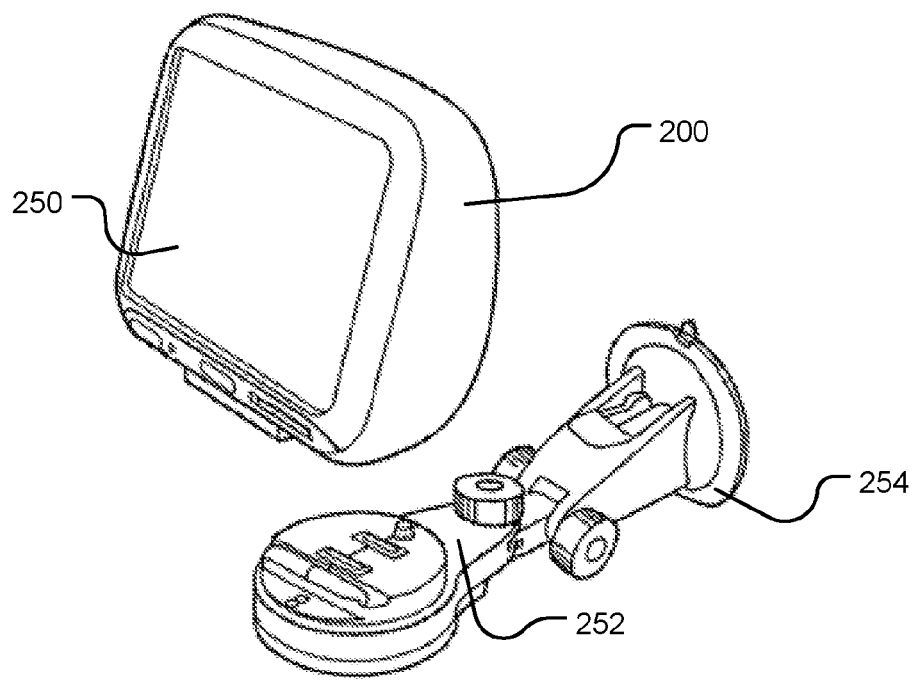
FIG. 5 is a schematic diagram of a docking arrangement for optional use in a vehicle.

In one arrangement, one aspect of the input device 204, the touch panel, and the display screen 206 are integrated so as to provide an integrated input and display device, including a touchpad or touchscreen input 250 (FIG. 5) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from input device 204 via a connection 210, and operatively connected to at least one of the display screen 206 and an output device 208, via respective output connections 212, to output information thereto. The output device 208 is, for example, an audible output device (e.g. including a loudspeaker). As the output device 208 can produce audible information for a user of the navigation apparatus 200, it should equally be understood that input device 204 can include a microphone and software for receiving input voice commands as well. Further, the navigation apparatus 200 can also include any additional input device 204 and/or any additional output device, such as audio input/output devices. The processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation apparatus 200. The memory resource 214 comprises, for example, a volatile memory, such as a Random Access Memory (RAM) and a non-volatile memory, for example a digital memory, such as a flash memory. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones.

FIG. 3 further illustrates an operative connection between the processor 202 and an antenna/receiver 224 via connection 226, wherein the antenna/receiver 224 can be a GPS antenna/receiver for example. It should be understood that the antenna and receiver designated by reference numeral 224 are combined schematically for illustration, but that the antenna and receiver may be separately located components, and that the antenna may be a GPS patch antenna or helical antenna for example.

In order to support communications in the GSM communications network, the processor 202 is also coupled to a cellular communications module 228 constituting the mobile telephone technology mentioned above. The cellular communications module 228 supports the communications interface 229. The cellular communications module 228 supports receipt of data via a data broadcast service, for example a one-to-many messaging service, such as a cell broadcast service. Hence, the communications interface 229 is compatible with the data broadcast service. In this example, the cell broadcast service is an example of a one-to-many text messaging service. The cellular communications module 228 also supports a bidirectional data communications service, for example a packet switched data service, such as a General Packet Radio Service (GPRS) supported by the GSM communications network. The communications interface 129 is therefore compatible with the bidirectional data communications service. The data broadcast service is, in this example and in contrast, not a packet switched data service. Furthermore, the data broadcast service is constrained by an operator of the GSM communications network, for example in the volume of a data that can be broadcast in respect of a broadcast data message. Additionally or alternatively, the data broadcast service can be constrained in another manner, not necessarily at the behest of the network operator. In this respect, the constraint can be a data rate or bandwidth limitation, for example a data rate less than that associated with the bidirectional data service.

The skilled person should therefore appreciate that the bidirectional data communications service is not a messaging service, for example a text messaging service. The bidirectional data communications service supports an Internet Protocol (IP) for data communications although use of other protocols is contemplated.

The data broadcast service therefore has a first Quality of Service (QoS) associated therewith that is different from and lower than a second QoS of the bidirectional data communications service.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation apparatus 200 described herein can be a portable or handheld navigation apparatus.

Figure 4:
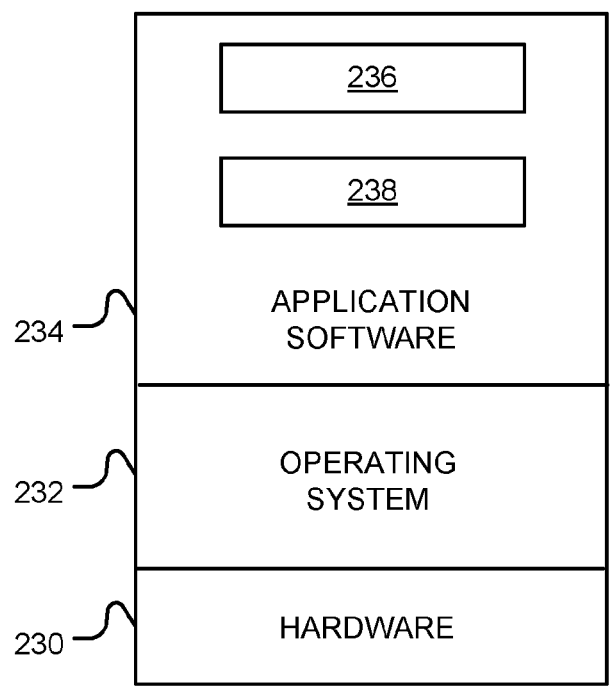
FIG. 4 is a schematic representation of an architectural stack employed by the navigation apparatus of FIG. 3.

Turning to FIG. 4, the memory resource 214 of the navigation apparatus 200 stores a boot loader program (not shown) that is executed by the processor 202 in order to load an operating system 232 from the memory resource 214 for execution by functional hardware components 230, which provides an environment in which application software 234 can run. The operating system 232 serves to control the functional hardware components 230 and resides between the application software 234 and the functional hardware components 230. The application software 234 provides an operational environment including the GUI that supports core functions of the navigation apparatus 200, for example map viewing, route planning, navigation functions and any other functions associated therewith. In this example, in order to implement the alert content reception apparatus, the application software 234 supports a broadcast data receipt module 236 and an alert content data request module 238.

To facilitate use thereof, the portable or handheld navigation apparatus 200 of FIG. 3 can be connected or "docked" in a known manner in an automobile, or any other suitable vehicle, for example to a bicycle, a motorbike or a boat. The navigation apparatus 200 is then removable from the docked location for portable or handheld navigation use. In this respect (FIG. 5), the navigation apparatus 200 may be a unit that includes the integrated input and display device 250 and the other components of FIG. 3 (including, but not limited to, the internal GPS receiver 224, the microprocessor 202, a power supply (not shown), memory resource 214, etc.).

The navigation apparatus 200 may sit on an arm 252, which itself may be secured to a vehicle dashboard/window/etc. using a suction cup 254. This arm 252 is one example of a docking station to which the navigation apparatus 200 can be docked. The navigation apparatus 200 can be docked or otherwise connected to the arm 252 of the docking station by snap connecting the navigation apparatus 200 to the arm 252 for example. The navigation apparatus 200 may then be rotatable on the arm 252. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

In operation, it is assumed, for the sake of conciseness of description, that the user, a visitor to the offices of the European Patent Office in The Hague, located at Patentlaan 2, Rijswijk, requires navigation assistance to the offices of Tom-Tom International BV located at Rembrandtplein 35, Amsterdam.

In order to implement navigation to the above destination using the navigation apparatus 200, the user configures a route for calculation as follows. Referring to FIGS. 6 to 14, the user undertakes an illustrative destination location input process described hereinbelow using a location browser function supported by the user interface. Although not shown, the user uses a settings menu option supported by the application software 234 in order to select view generation in a three-dimensional mode.

Figure 6:
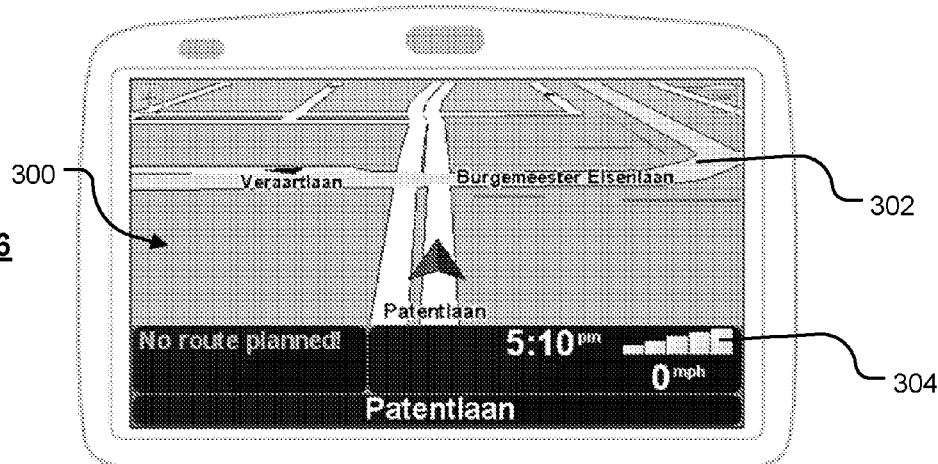
FIGS. 6 to 14 are screen shots of the navigation apparatus in relation to selection of a route associated with a proposed journey.

When the user powers-up the navigation apparatus 200, the apparatus 200 acquires GPS data and performs a self-location determination by calculating (in a known manner) the current location of the navigation apparatus 200. The user is then presented, as shown in FIG. 6, with a display 300 showing in pseudo three-dimensions: a local environment 302 in which the navigation apparatus 200 is determined to be located and, in a region 304 of the display 300 below the local environment 302, a set of control and status messages.

Figure 7:
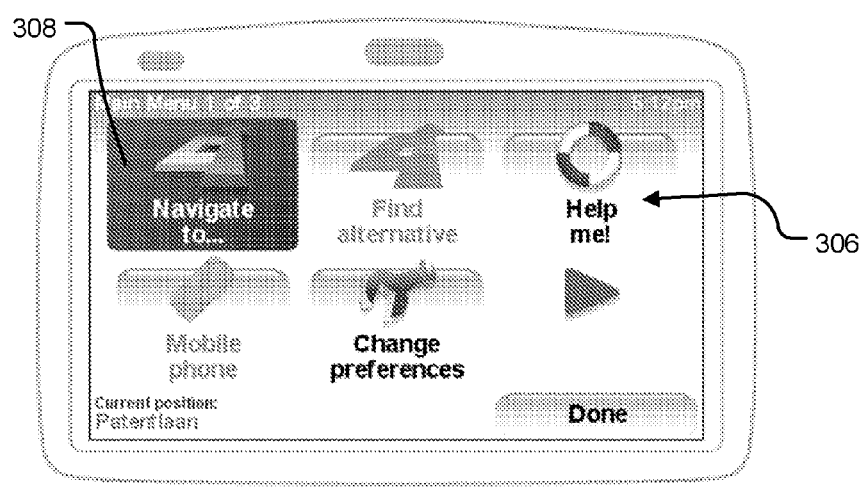

By touching the display at the local environment 302, the navigation apparatus 200, through the user interface, updates the display 300 by displaying (as shown in FIG. 7) a series of virtual or soft buttons 306 by means of which the user can, inter alia, input a destination to which the user wishes to navigate.

Figure 8:
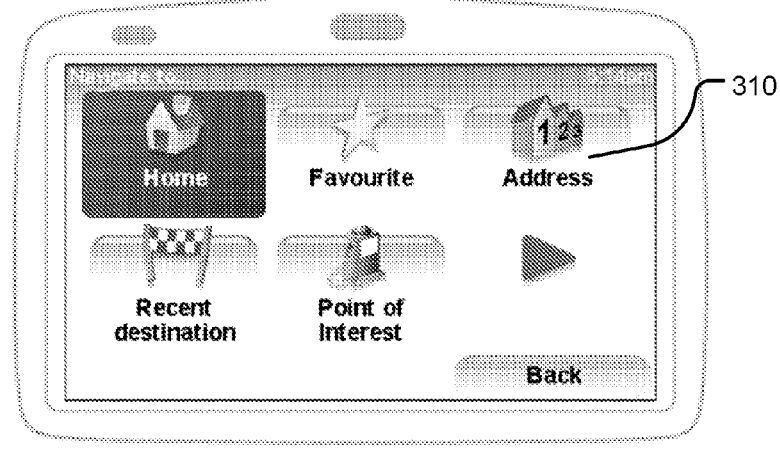

By touching the "Navigate to" virtual button 308, the navigation apparatus 200 initiates a route calculation procedure, a part of which comprises a route creation procedure. In accordance with the route creation procedure, the navigation apparatus 200 displays (as shown in FIG. 8) a plurality of virtual buttons that are each associated with a different category of selectable destinations. In this instance, the display shows a "home" button that if pressed would set the destination to a stored home location. The "favourite" button, if pressed, reveals a list of destinations that the user has previously stored in the navigation apparatus 200 and if one of these destinations is then selected the destination for the route to be calculated is set to the selected previously stored destination. The "recent destination" soft button, if pressed, reveals a list of selectable destinations held in the memory of the navigation apparatus 200 and to which the user has recently navigated. Selection of one of the destinations populating this list would set the destination location for this route to the selected (previously visited) location. The "point of interest" button, if pressed, reveals a number of options by means of which a user can opt to navigate to any of a plurality of locations, such as Automatic Teller Machines (ATMs), petrol stations or tourist attractions for example, that have been pre-stored in the navigation apparatus 200 as locations to which a user of the navigation apparatus 200 might want to navigate to. A triangular arrow-like virtual button provides access to additional sub-menu options relating to the "Navigate to . . . " menu option, and an "address" button 310 commences a process by which the user can input the street address of the destination to which the user wishes to navigate.

Figure 9:
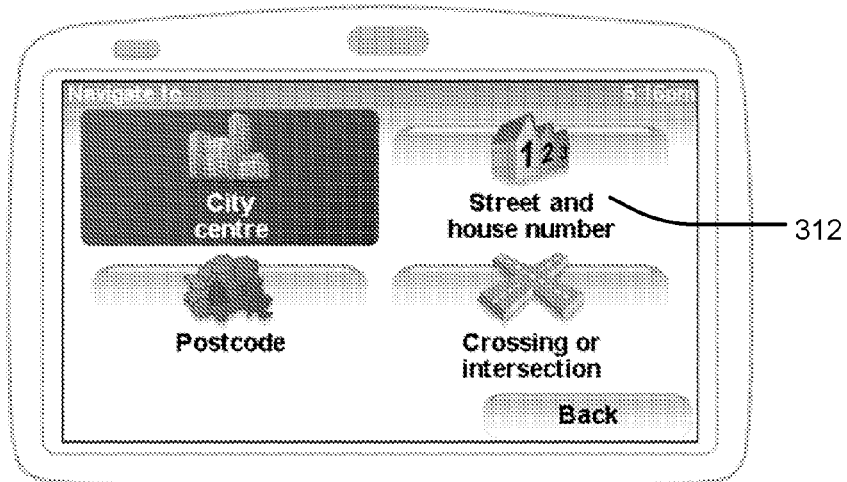

Since the user, in this example, knows the street address of the destination to which the user wishes the navigation apparatus 200 to navigate, it is assumed that the "address" button 310 is operated (by touching the button displayed on the touchscreen) in order to select a location as the destination, whereupon (as shown in FIG. 9) the user is presented with a series of address input options: address input by "city centre", by "postcode", by "crossing or intersection" (for example a junction of two roads) and by "street and house number".

Figure 10:

In this example, the user knows the street address and house number of the destination and hence selects a "street and house number" virtual button 312 whereupon the user is then presented, as shown in FIG. 10, with: a prompt 314 to enter the name of the city to which they wish to navigate, a flag button 316 by means of which the user can select the country in which the desired city is located, and a virtual keyboard 318 that may be operated by the user, if necessary, to input the name of the destination city. In this instance the user begins to type the word "Amsterdam" and the navigation apparatus 200 therefore responds by providing the user with a list 320 of selectable cites.

Figure 11:
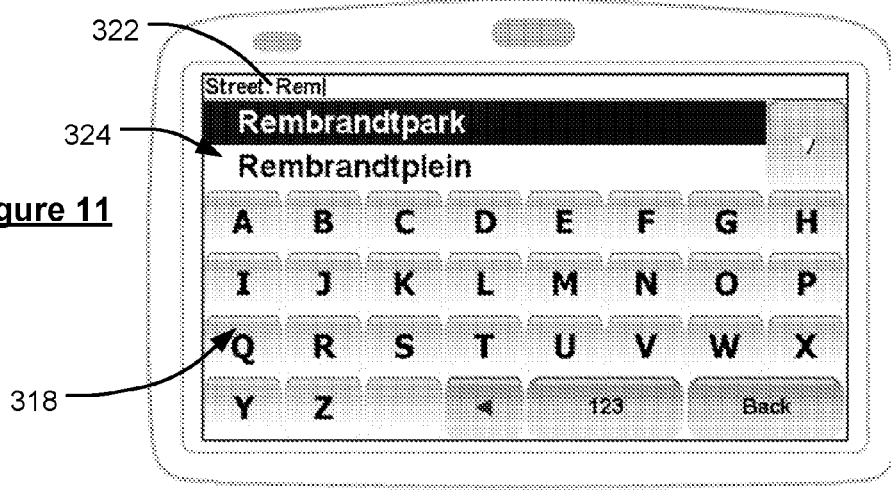
Figure 12:
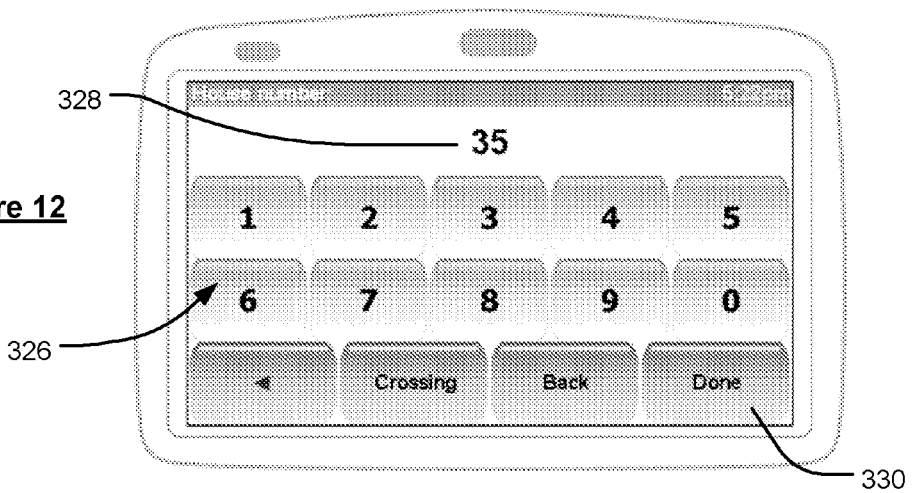
Figure 13:
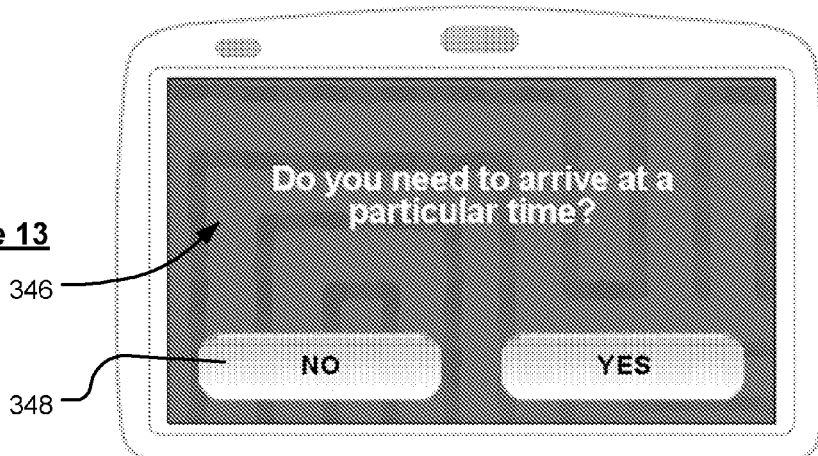

The user in this instance wishes to navigate to Amsterdam, and on selection of Amsterdam from the list 320 the navigation apparatus 200 displays, as shown in FIG. 11, the virtual keyboard 318 again by means of which the user can input street names, a prompt 322 for entry of a street name. In this instance, the user begins to type the name of the street in which the destination is located and the navigation apparatus 200 responds by providing the user with a list 324 of selectable street names.

In this example, the user wishes to travel to the street "Rembrandtplein" and so the user selects "Rembrandtplein" from the displayed list 324.

Once a street has been selected, the navigation apparatus 200 then displays (FIG. 12) a restricted, largely numeric, virtual keypad 326 and prompts the user, by means of prompt 328, to enter the street number in the selected street and city to which the user wishes to navigate. If the user has previously navigated to a building number in this street, then that number is initially shown. If, as in this instance, the user wishes to navigate to No. 35, Rembrandtplein, then the user simply needs to type the street number ("35") using the virtual keypad 326 and then touch a "done" virtual button 330 displayed at the bottom right hand corner of the display 300. If the user should wish to navigate to a different building number in Rembrandtplein, then all the user needs do is operate the virtual keypad 326 to input an appropriate building or street number.

In the event that the user decides that navigation to the building number suggested is required, the user touches the "Done" virtual button 330. The application software 266 then causes the user interface to present an interrogation message 346 (FIG. 13) asking the user whether a particular arrival time is required. If the user should touch a "yes" virtual button, then functionality is invoked that estimates the time required to travel to the destination (after provision by the user of the desired arrival time) and advises the user when they should leave (or if they are running late, should have left) their current location in order to arrive at their destination on time. In this instance, the user is not concerned about arriving at a particular time and hence selects a "no" virtual button 348.

Figure 14:
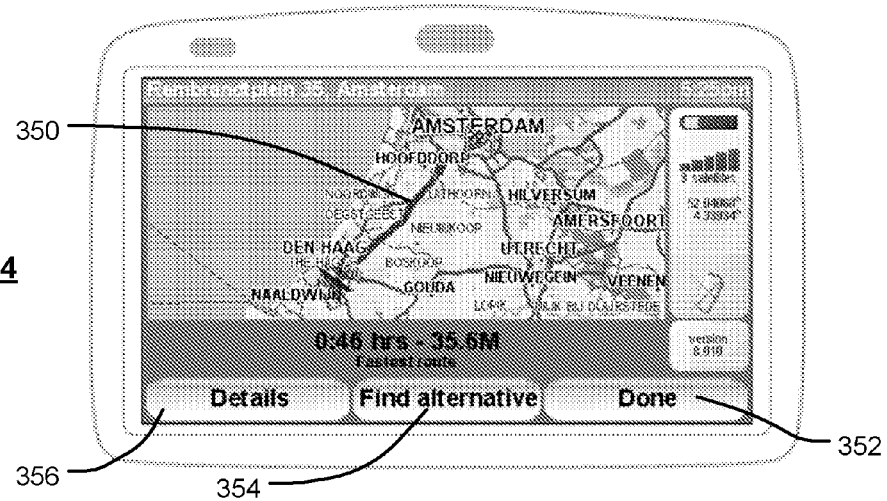

Selecting the "no" virtual button 348 causes the navigation apparatus 200 to calculate a route between the current location and the selected destination, and to display a route 350 calculated, as shown in FIG. 14, on a relatively low magnification map that shows the entire route. The user is also provided with a "done" virtual button 352 which the user can press to indicate the calculated route is acceptable, a "find alternative" virtual button 354 that the user can press to cause the navigation apparatus 200 to calculate another route to the selected destination, and a "details" virtual button 356 that a user can press to reveal selectable options for the display of more detailed information concerning the currently displayed route 350.

In this instance, it is assumed that the user considers the displayed route acceptable, and once the "done" button 352 has been pressed the user is presented, with a three-dimensional view (not shown) of the current, start, location for the navigation apparatus 200.

The user then commences their journey and the navigation apparatus 200 guides the user. The navigation apparatus 200 periodically acquires GPS data and performs a self-location determination by calculating (in a known manner) the current location of the navigation apparatus 200. Using the current location information calculated, the navigation apparatus 200, in a known manner, updates the map in accordance with determined changes in location of the navigation apparatus 200, and guides the user by providing visual and, optionally, audible navigation instructions until the destination selected is approaching or reached.

Figure 15:
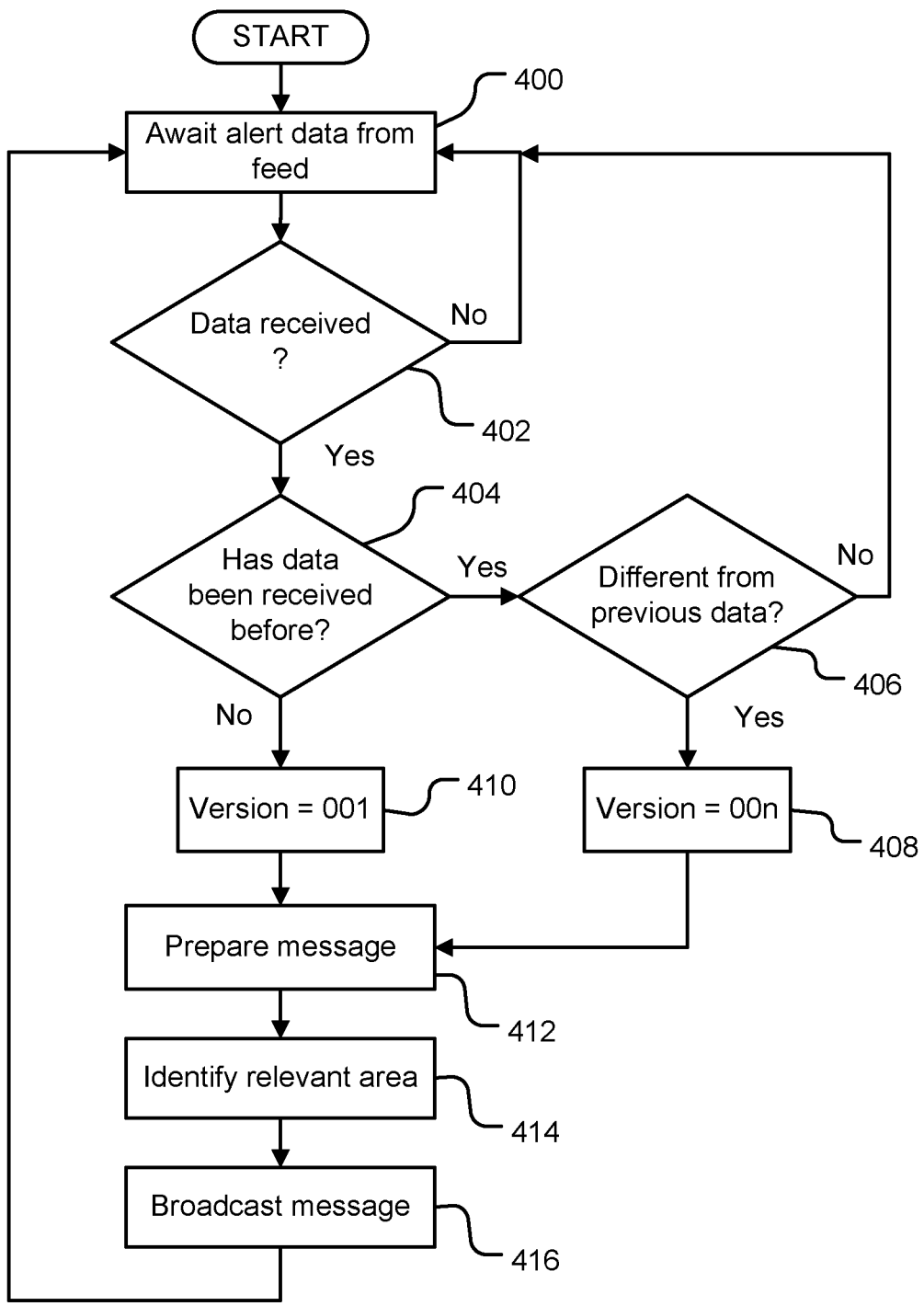
FIG. 15 is a flow diagram of a method of broadcasting a broadcast data message in the system of FIG. 2.

Referring to FIG. 15, the server 150 is, as described previously above, capable of communicating with the remote message source data server 166. In this example, the remote third party server 166 is used to generate data relating to telematics events and can use data provided by a public authority, for example a government authority, such as a Department for Transport, as well as proprietary sources of information, for example the TomTom HD Traffic system. The message source data server 166 supports a data feed of content, for example alert content, which is provided to the server 150. The alert content is, in this example, content that has to be communicated to or drawn to the attention of a recipient, for example a subscriber, or a number thereof with minimal delay. The data feed therefore provides, in this example, transport-related information, in particular emergency warning information or alerts that are of interest to road users, particularly motorists. It should, however, be appreciated that other types of information can additionally or alternatively be provided by the data feed from the message source data server 166.

The server 150 awaits (Step 400) receipt of alert content data from the remote server 166. When the alert content data is received (Step 402), the content handler module 155 supported by the server 150 determines (Step 404) whether the alert content data has already been received on a previous occasion, for example by comparing the alert content data received with alert content data previously stored in the data store 160, or by way of a version reference. If the alert content data is determined (Step 406) to be similar to that previously received, the content handler module 155 assigns (Step 408) a version number or code to the alert content data received and a unique reference and stores the alert content data, version number and reference in the data store 160. Of course, if desired, where a version reference has been received from the remote server 166, the version reference received can be used as the version number or code. In the event that alert content data is the same as that already received and stored in the data store 160, the content handler module 155 returns to awaiting (Step 400) receipt of further alert content data.

If the content handler module 155 determines that the alert content data received is new and not already stored in the data store 160 in identical or similar form, then the content handler module 155 assigns (Step 410) an initial version number or code, for example "001", and a unique reference to the alert content data received, for example a hexadecimal code, such as 3F. The alert content data received, the unique reference and version data are then stored in the data store 160.

Thereafter, the content handler module 155 generates (Step 412) a summary message comprising the reference. If alert content received comprised a geographical indication to which the alert content related, then the summary message is arranged to include the geographic indication. The summary message is communicated to the CBE 174, whereafter the CBE 174 communicates the summary message to the CBC 176. The CBC 176 then prepares a cell broadcast message. In the event that the summary message included the geographical indication, the CBC 176 upon receiving the summary message determines (Step 414) to which BTS or BTSs 180 the reference should be sent. The determination of which BTS or BTSs will broadcast the reference information received from the CBE 174 depends upon the specific implementation of the CBE 174 and the CBC 176 employed. The skilled person should therefore appreciate that the identification of the relevant BTS or BTSs to broadcast the information sent by the CBE 174 to the CBC 176 can be made by the CBE 174 in other embodiments.

Once the geographical extent of the cell broadcast message has been determined, the cell broadcast message is released to the relevant BSC or BSCs 178 for broadcast (Step 416) by an associated BTS 180 or BTSs in accordance with normal operation of the communications network in relation to cell broadcasts.

Figure 16:
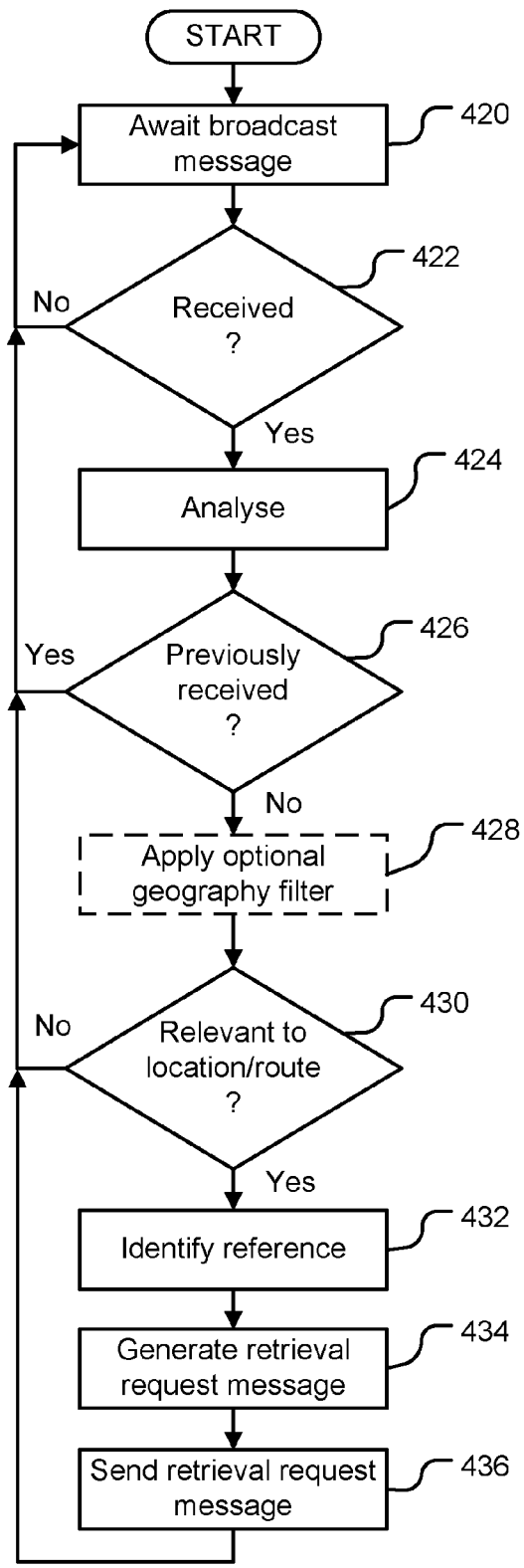
FIG. 16 is a flow diagram of a first part of a method of acquiring alert content.

Referring to FIG. 16, at the navigation apparatus 200 receipt of cell broadcasts over the GSM communications network using a predetermined channel number is enabled. The broadcast data receipt module 236, using the communications interface 229 of the cellular communications module 228 of the navigation apparatus 200 is therefore capable of receipt of and hence awaits (Step 420) receipt of a broadcast data message, for example the cell broadcast message mentioned above. When the broadcast message has been determined (Step 422) to have been received, the cell broadcast message is analysed (Step 424) by the broadcast data receipt module 236 and the reference contained in the cell broadcast message examined to determine (Step 426) whether a previous cell broadcast message has been previously received. In this respect, the navigation apparatus 200 uses the memory resource 214 in order to store a list of received references. If use of version data is enabled, the list can include version data associated with the reference. The reference contained in the cell broadcast message can be compared with the list of received messages in order to achieve the determination of whether the reference data has been previously received. If the reference data has been previously received (including any version match where applicable), the broadcast data receipt module 236 reverts to awaiting (Step 420) receipt of further cell broadcast messages.

In the event that the reference data has not been previously received (including any version match), the broadcast data receipt module 236 applies (Step 428) an optional geographical "filter" if a determination of geographical relevance is not made by the server 150 and/or the CBC 176. If the geographic filter is to be applied locally by the navigation apparatus 200, the cell broadcast message includes geographical information associated with the reference and hence the alert content. In this respect, the geographical information can be location coordinates. However, if convenient to do so, the geographical information can be of another kind, for example TMC area codes. Using the location information, the broadcast data receipt module 236 can determine (Step 430) whether the cell broadcast message and hence the alert content is relevant to the current location of the navigation apparatus 200, for example by accepting cell broadcast messages relating to a geographical location within a predetermined distance, for example 3 km, from the current location of the navigation apparatus 200.

If the cell broadcast message is deemed irrelevant to the current location of the navigation apparatus 200, the broadcast data receipt module 236 reverts to awaiting (Step 420) receipt of further cell broadcast messages.

In the event that the cell broadcast message is absent of geographical information and the geographic filtering is not being performed in the system infrastructure, the application software 234 can obtain further information from the server 150 by way of a specific request or by requesting retrieval of the alert content, comprising further geographical information, in the manner to be described later herein.

Alternatively, if the reference is relevant to the current location of the navigation apparatus 200, the broadcast data receipt module 236 communicates the cell broadcast message received to the alert content data request module 238 and the alert content data request module 238 identifies (Step 432) the reference and any version data and generates (Step 434) a retrieval request message in order to acquire or retrieve the alert content associated with the reference from the server 150. In this respect, the retrieval request message comprises the reference and any version data in order to identify the alert content sought. The alert content data request module 238, using the communications interface 229 of the navigation apparatus 200, communicates (Step 436) the retrieval request message to the server 150 via the bidirectional data communication service.

At the server 150, the content handler module 155 receives the retrieval request message and uses the reference and any version data to access the data store 160 in order to retrieve the alert content therefrom. In this example, the alert content comprises the narrative text, a reference, any mandatory detour information, location information and version data. An example of these fields is shown in Table I below.

TABLE I

| Message | Gas leak with danger of explosion; motorists are requested to give way to emergency services vehicles; stranded vehicles should close all windows and shut |

TABLE I-continued

| | down ventilation; mandatory detour(s) is/are indicated by public authorities for motorists entering the area |
| Location | Boxtel on A2 between Eindhoven and 's Hertogenbosch (loc code = 36006) |
| Message Reference | $3F_{hex}$ |
| Message Reference Version | 01 |

Another, simpler, example is shown in Table II below.

TABLE II

| Message | Ghost driver |
| Location | 32606 |
| Message Reference | $3E_{hex}$ |
| Message Reference Version | 02 |

The detour information can be provided in the form of a location or route segment to be avoided.

Following access of the alert content, the content handler module 155 generates a retrieval reply message comprising the information retrieved from the data store 160 and sends the retrieval reply message to the navigation apparatus 200 via the bidirectional communications service.

Figure 17:
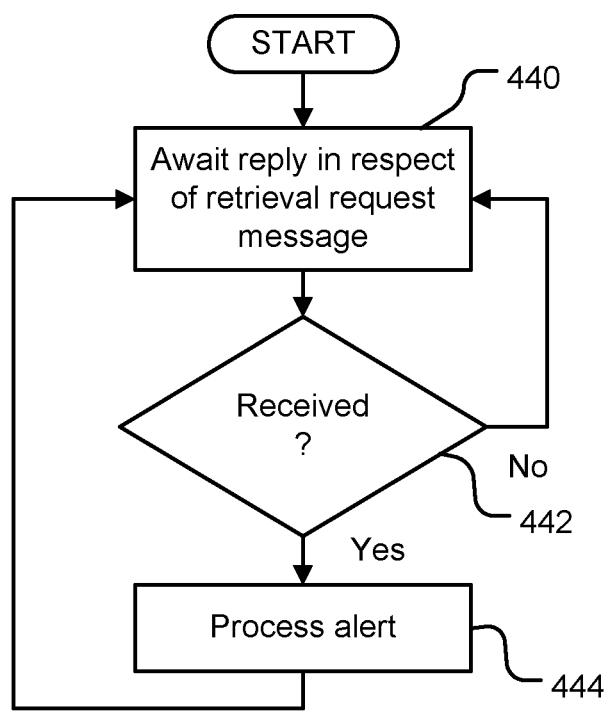
FIG. 17 is a flow diagram of a second part of the method of acquiring alert content.

Turning to FIG. 17, at the navigation apparatus 200, the alert content data request module 238 awaits (Step 440) receipt of the retrieval reply message (or content delivery message) containing the alert content as identified in the retrieval request message. Upon receipt (Step 442) of the retrieval reply message, the alert content is retrieved from the retrieval reply message and passed to the application software 234 for subsequent use (Step 444).

In this respect, the subsequent use can be simple display of the emergency warning message and location via the display 300. Additionally or alternatively, any detour information can be used by the application software 234 to trigger implementation of a detour and hence route re-calculation. In this respect, the trigger can initiate a user interaction message being displayed, presenting the emergency warning message and asking the user if a detour and route re-calculation is required in order to avoid the location associated with the alert content. If required, the detour information can additionally or alternatively be communicated in the cell broadcast message. In any event, the detour information can be organised in any suitable manner, for example in accordance with a so-called Agora-C location referencing method.

In another embodiment, instead of using the cell broadcast functionality of the GSM communications network, the server 150 is arranged to cooperate with a radio telematics broadcast service, using for example a radio telematics broadcast channel, such as an RDS-TMC service. The navigation apparatus 200 is therefore arranged to support receipt of RDS-TMC data and can comprise or by coupled to an RDS-TMC receiver. Hence, the reference data and any version data is communicated via the RDS-TMC data service provided by some Frequency Modulation (FM) broadcasters. The RDS-TMC receiver of the navigation apparatus 200 is provided to receive RDS data broadcasts, decode the RDS data broadcasts and extract the TMC data included in the RDS broadcasts. In this example, the TMC data comprises the reference and any version data mentioned above. Once the reference has been received (and any version and geographic data), the navigation apparatus 200 responds to receipt of the information in a like manner to that described in relation to the previous embodiment employing the cell broadcast functionality of the GSM communications network.

The use of the TMC of the RDS is just one example of use of the RDS to communicate, for example the version data and/or the reference data, and another RDS service can be created, if desired, to support the above-described data communication.

In a further embodiment, any of the above-described embodiments can be modified to accommodate a priority system whereby a priority is associated with the alert content. Priority data can therefore be communicated in the cell broadcast message and/or with the alert content acquired by the navigation apparatus 200. The application software 234 can then use the alert content according to the priority allocated thereto, including ordering the alert content received by associated priority.

In yet another embodiment, the alert content can have an expiry date and/or time or lifespan associated therewith, the application software 234 being arranged to ignore or discard the alert content once expiry thereof has been reached. Additionally or alternatively, the server 150 can be arranged to cancel or discontinue a given alert by communication of the reference using the cell broadcast facility and a reserved version number, for example "0", in order to indicate that the alert associated with the reference is obsolete.

In an above embodiment, GSM cell broadcasts are employed as an example of a so-called unconfirmed push service. However, although the GSM cell broadcast has been employed, the cell broadcast facility need not be a GSM cell broadcast and other cell broadcast facilities supported by other communications systems can be employed, for example the UMTS.

Furthermore, the above embodiments have been described in the context of the navigation apparatus 200 being in a mode of operation that provides navigation assistance to the user. However, the above embodiments can apply to scenarios when the navigation apparatus 200 is simply being used in relation to "free driving" as mentioned previously.

Whilst an above embodiment has been described in the context of the RDS, the skilled person will appreciate the above embodiments can be employed in relation to the different technical specification implemented in North America, for example in the United States of America, known as the Radio Broadcast Data System (RBDS). Hence, for the avoidance of doubt, references herein to the RDS should be construed to embrace the RBDS as well.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, instead of use of the RDS-TMC service, a TPEG service associated with a DAB service can be employed.

By way of another example, the geographical information as described above is used to determine whether the alert content is relevant to a current location of the navigation apparatus 200. However, the geographical information can be used to determine whether the alert content is relevant to the route calculated by the navigation apparatus 200 or a remaining part thereof. In this respect, the broadcast data receipt module 236 can be arranged to deem geographical information within a predetermined distance or proximity, for example 3 km, of the calculated route or the remaining part thereof to be relevant or of interest to the user of the navigation apparatus 200.

As a further example, whilst embodiments described in the foregoing detailed description refer to GPS, it should be noted that the navigation apparatus may utilise any kind of position sensing technology as an alternative to (or indeed in addition to) the GPS. For example the navigation apparatus may utilise other global navigation satellite systems (GNSS) such as the proposed European Galileo system when available. Equally, it is not limited to satellite based but could readily function using ground based beacons or any other kind of system that enables the device to determine its geographic location, for example the long range navigation (LORAN)-C system.

By way of further example, it should be appreciated that although the above embodiments have been described in the context of a navigation apparatus, the techniques described herein are not only applicable to navigation apparatus, but also to any other electronic apparatus in respect of which it is desirable to receive alert content or "pushed" content, for example mobile telephones or media players, such as music players, in particular but not exclusively MP3 players or accessories therefor.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A portable electronic processing device for use in a vehicle, comprising:
   an alert content reception apparatus comprising: a communications interface compatible with a data broadcast service and a wireless bidirectional data communications service; and a processing resource; and
   a memory resource,
   the communications interface being arranged to receive broadcast data messages from the data broadcast service, each broadcast data message comprising reference data identifying alert content stored at a remote server apparatus, the processing resource being arranged to:
analyze a received broadcast data message to determine the reference data;
compare the determined reference data to a list of reference data from previously received broadcast data messages stored in the memory resource; and
generate a request message comprising the reference data for transmittal by the communications interface in response to determining that the reference data has not been previously received, the communications interface being further arranged to: transmit the generated request message via the bidirectional data communications service to retrieve the alert content associated with the reference data in the request message from the remote server apparatus; and receive a reply message from the remote server apparatus via the bidirectional data communications service, the reply message comprising the alert content associated with the reference data in the request message, wherein the retrieved alert content comprises traffic- or travel-related data relevant to a user of the vehicle, and
wherein the processing resource is arranged to at least one of: implement a recalculation of a route to a destination based on the retrieved alert content; and present the retrieved alert content to the user using an output interface of the portable electronic processing device.

2. The portable electronic processing device of claim 1, further comprising a receiver of location-related data, the receiver being operably coupled to the processing resource, and wherein each broadcast data message comprises geographical indication data identifying a location associated with the alert content, the processing resource being further arranged to:
determine a current location of the portable electronic processing device from received location-related data;
analyze a received broadcast data message to determine the geographical indication data; and
generate the request message in response to determining that the reference data has not been previously received and determining that the location associated with the alert content is within a predetermined distance of the current location of the portable electronic processing device.

3. The portable electronic processing device of claim 1, further comprising a receiver of location-related data, the receiver being operably coupled to the processing resource, and wherein each broadcast data message comprises geographical indication data identifying a location associated with the alert content, the processing resource being further arranged to:
calculate a route to a destination;
analyze a received broadcast data message to determine the geographical indication data; and
generate the request message in response to determining that the reference data has not been previously received and determining that the location associated with the alert content relates to the calculated route or a remaining part thereof.

4. The portable electronic processing device of claim 1, wherein the processing resource is further arranged to present the retrieved alert content to a user on a display of the portable electronic processing device.

5. The portable electronic processing device of claim 1, wherein the data broadcast service comprises a one-to-many messaging service, and wherein the bidirectional data communications service comprise a packet switched data service.

6. The portable electronic processing device of claim 1, wherein the reference data comprises version data.

7. The portable electronic processing device of claim 1, wherein each broadcast data message comprises priority data, and the processing resource is arranged to:
determine a level of priority associated with the alert content using the priority data; and
retrieve alert content from the remote server apparatus in an order according to the determined level of priority.

8. A method of acquiring alert content at a portable electronic processing device for use in a vehicle comprising: an alert content reception apparatus comprising: a communications interface compatible with a data broadcast service and a bidirectional data communications service; and a processing resource; and a memory resource, the method comprising:
receiving a broadcast data message from a data broadcast service using the communications interface, each broadcast data message comprising reference data identifying alert content stored at a remote server apparatus;
analyzing, by the processing resource, the received broadcast data message to determine the reference data;
comparing, by the processing resource, the determined reference data to a list of reference data from previously received broadcast data messages stored in the memory resource;
generating, by the processing resource, a request message comprising the reference data in response to determining that the reference data has not been previously received;
transmitting the generated request message via the bidirectional data communications service using the communications interface to retrieve the alert content associated with the reference data in the request message from the remote server apparatus; and
receiving a reply message from the remote server apparatus via the bidirectional data communications service using the communications interface, the reply message comprising the alert content associated with the reference data in the request message, wherein the retrieved alert content comprises traffic- or travel-related data relevant to a user of the vehicle, and
wherein the processing resource is used to at least one of: implement a recalculation of a route to a destination based on the retrieved alert content; and present the retrieved alert content to the user using an output interface of the portable electronic processing device.

9. A non-transitory computer readable storage medium storing instructions that, when executed by a portable electronic processing device for use in a vehicle, cause the portable electronic processing device to perform a method comprising:
receiving a broadcast data message from a data broadcast service using the communications interface, each broadcast data message comprising reference data identifying alert content stored at a remote server apparatus;
analyzing, by the processing resource, the received broadcast data message to determine the reference data;
comparing, by the processing resource, the determined reference data to a list of reference data from previously received broadcast data messages stored in the memory resource;
generating, by the processing resource, a request message comprising the reference data in response to determining that the reference data has not been previously received;
transmitting the generated request message via the bidirectional data communications service using the communications interface to retrieve the alert content associated with the reference data in the request message from the remote server apparatus; and receiving a reply message from the remote server apparatus via the bidirectional data communications service using the communications interface, the reply message comprising the alert content associated with the reference data in the request message, wherein the retrieved alert content comprises traffic- or travel-related data relevant to a user of the vehicle, and wherein the processing resource is used to at least one of: implement a recalculation of a route to a destination based on the retrieved alert content; and present the retrieved alert content to the user using an output interface of the portable electronic processing device.

* * * * *